United States Patent
Ye (10) Patent No.: US 12,449,251 B2
(45) Date of Patent: Oct. 21, 2025

(54) METHOD OF MEASURING THICKNESS OF DISPLAY DEVICE

(71) Applicant: Samsung Display Co., LTD., Yongin-si (KR)

(72) Inventor: Sang Heon Ye, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 199 days.

(21) Appl. No.: 18/211,456

(22) Filed: Jun. 19, 2023

(65) Prior Publication Data

US 2024/0068800 A1 Feb. 29, 2024

(30) Foreign Application Priority Data

Aug. 26, 2022 (KR) .................. 10-2022-0107783

(51) Int. Cl.
*G01B 11/06* (2006.01)
*G06V 40/13* (2022.01)

(52) U.S. Cl.
CPC ...... *G01B 11/0633* (2013.01); *G06V 40/1318* (2022.01); *G01B 2210/58* (2013.01); *G06V 2201/07* (2022.01)

(58) Field of Classification Search
CPC ............ G01B 11/0633; G01B 11/0641; G01B 11/0616; G01B 11/06; G01B 2210/58; G06V 40/1318; G06V 2201/07; H10K 50/865; H10K 59/38; H10K 59/60; H10K 71/70; H10K 2102/351
See application file for complete search history.

(56) References Cited

U.S. PATENT DOCUMENTS

| | | | |
|---|---|---|---|
| 2007/0121124 A1* | 5/2007 | Nabatova-Gabain | G01B 11/0641 356/630 |
| 2018/0190170 A1* | 7/2018 | Yang | G01N 21/8422 |
| 2021/0158751 A1* | 5/2021 | Cha | G06V 10/143 |
| 2021/0233975 A1* | 7/2021 | Bouthinon | G06F 3/0412 |
| 2021/0359036 A1* | 11/2021 | You | H10K 59/35 |
| 2021/0381886 A1* | 12/2021 | Chen | G02F 1/13318 |
| 2023/0212382 A1* | 7/2023 | Uhm | H10K 50/84 313/512 |

FOREIGN PATENT DOCUMENTS

| | | |
|---|---|---|
| KR | 101418760 B1 | 7/2014 |
| KR | 1020150032966 A | 4/2015 |
| KR | 1020160117181 A | 10/2016 |
| KR | 1020210006093 A | 1/2021 |

* cited by examiner

*Primary Examiner* — Tarifur R Chowdhury
*Assistant Examiner* — Carlos Perez-Guzman
(74) *Attorney, Agent, or Firm* — CANTOR COLBURN LLP (57) ABSTRACT

A method of measuring a thickness of a display device according to an embodiment includes: acquiring a sensing value by scanning external light to a photo sensing pixel of the display device; and measuring an organic layer thickness at a tag part of the display device and comparing the measured thickness with the sensing value.

18 Claims, 13 Drawing Sheets

METHOD OF MEASURING THICKNESS OF DISPLAY DEVICE

This application claims priority to Korean Patent Application No. 10-2022-0107783, filed on Aug. 26, 2022, and all the benefits accruing therefrom under 35 U.S.C. § 119, the content of which in its entirety is herein incorporated by reference.

BACKGROUND

(a) Technical Field

The present disclosure relates to a method of measuring a thickness of a display device, and more specifically, a method of measuring a thickness of an organic layer of a display device including a photo sensing pixel.

(b) Description of the Related Art

A multimedia display device such as televisions, portable phones, tablet computers, navigation devices, and game machines is provided with a display device for displaying images. The display device may include an input sensing panel that may provide a touch-based input method that allows users to easily, intuitively, and conveniently input information or instructions in addition to usual input methods such as buttons, keyboards, and mice.

A method of using a fingerprint, which is one of biometric information, as user authentication means for online banking, a product purchase, security, etc. has been proposed, and a demand for a touch display device having a fingerprint recognition function is increasing.

SUMMARY

Embodiments are to provide a method for measuring an organic layer thickness of a display device including a photo sensing pixel.

A method of measuring a thickness of a display device according to an embodiment includes: acquiring a sensing value by scanning external light to a photo sensing pixel of the display device; and measuring an organic layer thickness at a tag part of the display device and comparing the measured thickness with the sensing value.

The external light may be a light with a wavelength of 530 nanometers (nm).

The measuring of the organic layer thickness at the tag part of the display device may be made using an In Chamber Ellipsometer ("ICE").

In the acquiring of the sensing value by scanning the external light to the photo sensing pixel, a difference between a target thickness and a deposition thickness of the organic layer may be derived through the comparison of the sensing value and the measured thickness.

In the measuring of the organic layer thickness at the tag part of the display device and comparing the measured thickness with the sensing value, it may be determined whether the deposition thickness is thicker or thinner than the target thickness.

The display device includes a light emission pixel and a photo sensing pixel.

The light emission pixel may include a light-emitting element and a color filter positioned on the light-emitting element, and the photo sensing pixel may include a photo sensing element and a transparent layer positioned on the photo sensing element.

The color filter and the transparent layer may be positioned in the same layer.

The organic layer of the tag part of the display device and the transparent layer may be formed by the same process and have the same thickness.

The photo sensing pixel may detect the user's fingerprint.

A wavelength of light used for photo sensing of the photo sensing pixel and a wavelength of the external light used in the acquiring of the sensing value by scanning external light to the photo sensing pixel may be the same.

The tag part of the display device may have the same stacked structure as the photo sensing pixel of the display device.

The tag part of the display device may be positioned at an edge of the display device.

The tag part of the display device may be positioned in a non-display area of the display device.

In the measuring of the organic layer thickness at the tag part of the display device and comparing the measured thickness with the sensing value, measurement equipment may be positioned under the display device during the measurement.

The light emission pixel may include a red pixel, a green pixel, and a blue pixel.

The green pixel may be positioned above and below the photo sensing pixel in a second direction.

The red pixel and blue pixels may be positioned to a left and a right of the photo sensing pixel in a first direction perpendicular to the second direction, respectively.

The display device may further include a light blocking member positioned between the transparent layer and the color filter may be further included.

The light blocking member may define an opening therein overlapping the light emission pixel and the photo sensing pixel, and a shape of the opening may be quadrangular in a plan view.

According to embodiments, the method for measuring the organic layer thickness of the display device including the photo sensing pixel is provided.

DETAILED DESCRIPTION

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In order to clarify the present invention, parts that are not connected with the description will be omitted, and the same elements or equivalents are referred to by the same reference numerals throughout the specification.

Further, since sizes and thicknesses of constituent members shown in the accompanying drawings are arbitrarily given for better understanding and ease of description, the present invention is not limited to the illustrated sizes and thicknesses. In the drawings, the thickness of layers, films, panels, regions, etc., are exaggerated for clarity. In the drawings, for better understanding and ease of description, thicknesses of some layers and areas are excessively displayed.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise", and variations such as "comprises" or "comprising", will be understood to imply the inclusion of stated elements but not the exclusion of any other elements.

Further, in the specification, the phrase "on a plane" means when an object portion is viewed from above (i.e., in a plan view; view in a third direction DR3), and the phrase "on a cross-section" means when a cross-section taken by vertically cutting an object portion is viewed from the side.

Hereinafter, a method of measuring a thickness of the display device according to the present embodiment will be described in detail with reference to accompanying drawings. The display device in the present embodiment is a display device including a photo sensing pixel. Specifically, the present embodiment is a method for measuring the thickness of an organic layer overlapping the photo sensing pixel.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Now, the structure of the display device including the photo sensing pixel according to the present embodiment will be briefly described below.

Figure 1:
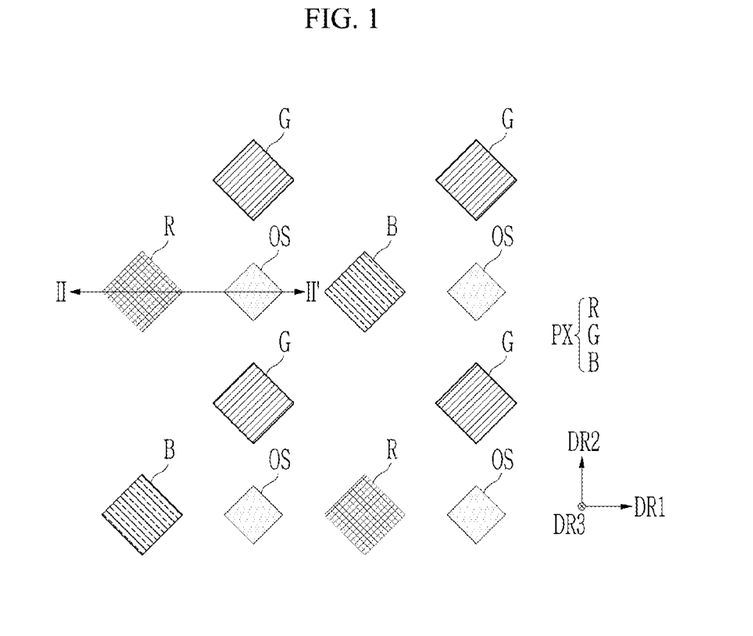
FIG. 1 is a view showing an arrangement of a light emission pixel PX and a photo sensing pixel OS on a plane in a display device according to the present embodiment.

FIG. 1 is a view showing an arrangement of a light emission pixel PX and a photo sensing pixel OS on a plane in a display device according to the present embodiment. Referring to FIG. 1, each light emission pixel PX may include a light-emitting element to emit light. Specifically, the light emission pixel PX may include a red pixel R, a green pixel G, and a blue pixel B. The red pixel R may emit red light, the green pixel G may emit green light, and the blue pixel B may emit blue light. The photo sensing pixel OS may include a photo sensing element to sense external light. Such a photo sensing pixel OS may recognize a fingerprint by sensing the external light. That is, the fingerprint may be recognized by detecting the light reflected by ridges of the fingerprint or valleys between the ridges.

In FIG. 1, each of the light emission pixel PX and the photo sensing pixel OS is shown based on the pixel opening. At this time, the opening shape of each pixel, as shown in FIG. 1, may be quadrangular. However, this is only an example and the opening shape is not limited thereto.

As shown in FIG. 1, the green pixel G may be positioned above and below in the second direction DR2 of one photo sensing pixel OS, and the red pixel R and the blue pixel B may be positioned on the left and the right in the first direction DR1, respectively. However, this arrangement is only an example, and the arrangement of the light emission pixel PX and the photo sensing pixel OS may vary according to an embodiment.

Figure 2:
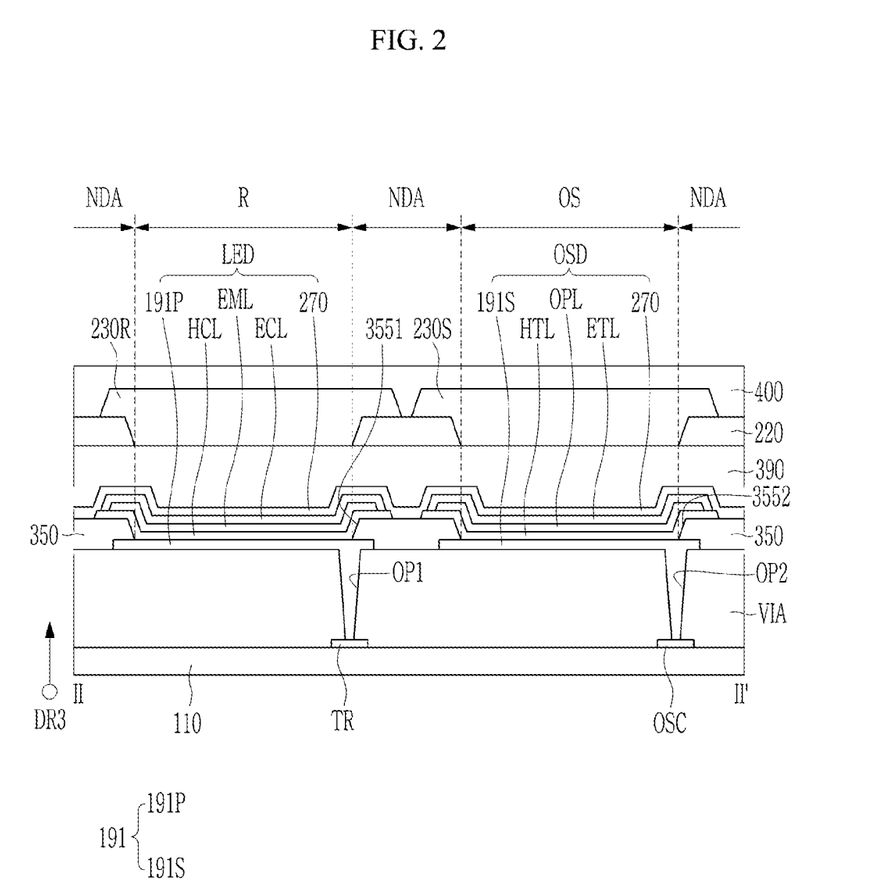
FIG. 2 is a cross-section taken along line II-II' of FIG. 1.

FIG. 2 is a cross-section taken along line II-II' of FIG. 1. Referring to FIG. 2, a transistor TR and a photo sensing circuit OSC are positioned on a substrate 110. FIG. 2 shows the red pixel R, the photo sensing pixel OS, and a non-display area NDA.

The transistor TR may transmit a driving signal and a voltage for driving a light-emitting element LED. The photo sensing circuit OSC may sense light through photo charges generated by photo sensing element OSD. The transistor TR and the photo sensing circuit OSC may include a plurality of wires including a gate line and a data line, and a semiconductor. The detailed operation of the photo sensing circuit OSC will be described later in FIG. 3 and FIG. 4 in detail separately.

An insulating layer VIA may be positioned on the transistor TR and the photo sensing circuit OSC. The insulating layer may include an organic material. Specifically, the insulating layer VIA may include organic insulating materials such as general-purpose polymers such as polymethylmethacrylate ("PMMA") or polystyrene ("PS"), polymer derivatives with phenolic groups, acryl-based polymers, imide-based polymers, polyimides, and siloxane-based polymers.

A first electrode 191 is positioned on the insulating layer VIA. The first electrode 191 includes a first light emission electrode 191P of the light-emitting element LED and a first sensing electrode 191S of the photo sensing element OSD. The insulating layer VIA includes a first opening OP1 and a second opening OP2. The first light emission electrode 191P of the light-emitting element LED may be connected to the transistor TR through the first opening OP1, and the first sensing electrode 191S of the photo sensing element OSD may be connected to the photo sensing circuit OSC through the second opening OP2. The first light emission electrode 191P and the first sensing electrode 191S may be formed by the same process and may include the same material.

A partition wall 350 may be positioned on the first light emission electrode 191P and the first sensing electrode 191S. The partition wall 350 defines a first opening 3551 overlapping the first light emission electrode 191P and a second opening 3552 overlapping the first sensing electrode 191S in a plan view.

A hole control layer HCL may be positioned in the first opening 3551 overlapping the first light emission electrode 191P in a plan view. An emission layer EML may be positioned over the hole control layer HCL, and an electron control layer ECL may be positioned over the emission layer. The hole control layer HCL may include a hole injection layer and a hole transport layer. Likewise, the electron control layer ECL may include an electron injection layer and an electron transport layer. The emission layer EML may emit blue, green, and red light in each pixel. The emission layer EML may have a structure in which a plurality of emission layers emitting different colors are stacked.

A hole transport layer HTL may be positioned within the second opening 3552 overlapping the first sensing electrode 191S in a plan view. The hole transport layer HTL may be formed by the same process with the same material as the hole control layer HCL of the light-emitting element. A photoelectric conversion layer OPL is positioned on the hole transport layer HTL. The photoelectric conversion layer OPL may generate the photo charges corresponding to the light reflected by the ridges or the valleys between the ridges of the fingerprint and transmit them to the photo sensing circuit OSC. The electron transport layer ETL may be positioned on the photoelectric conversion layer OPL.

Although it will be described separately later, the hole control layer HCL and the electron control layer ECL of the light emission pixel PX may be formed in the same process as the hole transport layer HTL and the electron transport layer ETL of the photo sensing pixel OS, respectively, and may contain the same material.

The second electrode 270 may be positioned on the electron transport layer ETL and electron control layer ECL. The second electrode 270 may be entirely positioned on a plurality of photo sensing pixels OS and a plurality of light emission pixels PX in a plate shape. In the light emission pixel PX, the first light emission electrode 191P, the hole control layer HCL, the emission layer EML, the electron control layer ECL, and the second electrode 270 constitute the light-emitting element LED. In the photo sensing pixel OS, the first sensing electrode 191S, the hole transport layer HTL, the photoelectric conversion layer OPL, the electron transport layer ETL, and the second electrode 270 constitute the photo sensing element OSD. A capping layer 390 may be positioned on the second electrode 270.

Referring to FIG. 2, the light blocking member 220 may be positioned on the capping layer 390. The light blocking member 220 may be positioned to overlap the partition wall 350 in the direction (i.e., the third direction DR3) perpendicular to the substrate 110. A color filter 230R and a transparent layer 230S may be positioned between the light blocking member 220. In FIG. 2, the red pixel R is shown, and then the red color filter 230R is positioned. In addition, the transparent layer 230S is positioned overlapping with the photo sensing pixel OS in a plan view. The transparent layer 230S may amplify light incident to the photo sensing pixel OS by a resonance. The transparent layer 230S may include an organic material, and the transparent layer 230S may be positioned on the same layer as the color filter including the red color filter 230R. In order to maximize the sensing performance of the photo sensing pixel OS, it is important to form the transparent layer 230S with an appropriate thickness.

A cover layer 400 may be positioned on the color filter 230R and the transparent layer 230S.

Hereinafter, the operation of the photo sensing pixel OS will be described with reference to FIG. 3.

Figure 3:
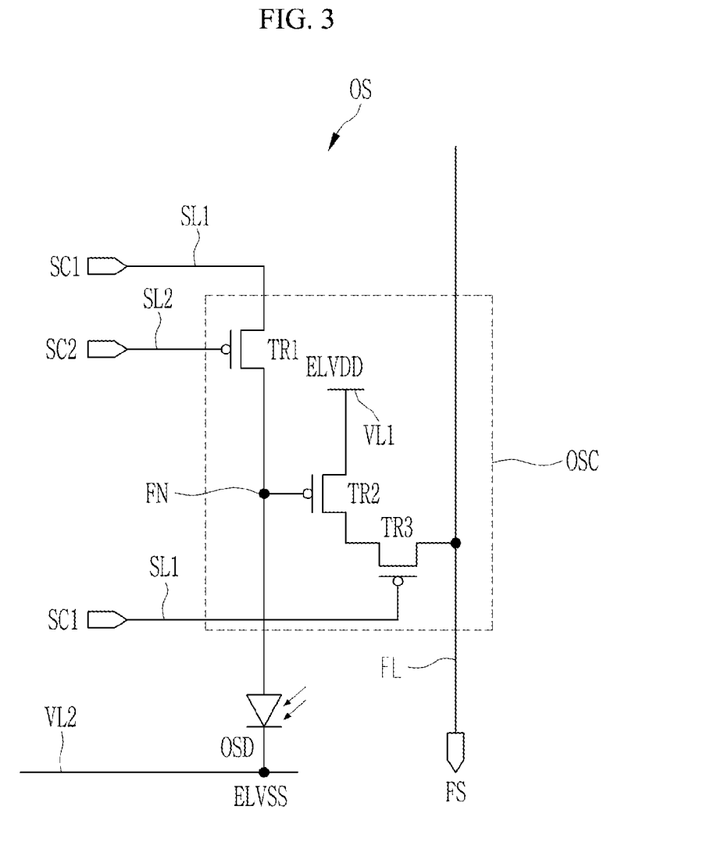
FIG. 3 is a view showing a circuit configuration of a photo sensing pixel.

FIG. 3 is a view showing a circuit configuration of a photo sensing pixel OS. Referring to FIG. 3, the photo sensing pixel OS includes a photo sensing element OSD and a photo sensing circuit OSC. Referring to FIG. 3, the photo sensing circuit OSC includes a reset transistor TR1, an amplification transistor TR2, and an output transistor TR3. Each transistor may be a P-type transistor such as a PMOS, but is not limited thereto, and at least one of the reset transistor TR1, the amplification transistor TR2, and the output transistor TR3 may be an N-type transistor.

In addition, the circuit configuration of the photo sensing pixel OSD according to the present invention is not limited to FIG. 3. The photo sensing circuit OSC shown in FIG. 3 is an example, and the configuration of the photo sensing circuit OSC may be modified and implemented.

Referring to FIG. 3, the photo sensing pixel OS of the display device according to an embodiment may include a fingerprint sensing line FL, a first scan line SL1, a second scan line SL2, a first voltage line VL1, a second voltage line VL2, a reset transistor TR1, an amplification transistor TR2, an output transistor TR3, and at least one photo sensing element OSD. This embodiment describes an example in which one photo sensing pixel OS includes one photo sensing element OSD.

The gate electrode of the reset transistor TR1 is connected to the second scan line SL2, the source electrode of the reset transistor TR1 is connected to the first scan line SL1, and the drain electrode of the reset transistor TR1 is electrically connected to the charge storing node FN. The reset transistor TR1 may reset the charge storing node FN in response to the second scan signal SC2 transmitted from the second scan line SL2.

The gate electrode of the amplification transistor TR2 is electrically connected to the charge storing node FN, the source electrode of the amplification transistor TR2 is connected to the first voltage line VL1, and the drain electrode of the amplification transistor TR2 is connected to the source electrode of the output transistor TR3. The amplification transistor TR2 may be turned on by the voltage level of the charge storing node FN to transmit a first power voltage EVLDD transmitted from the first voltage line VL1 to the source electrode of the output transistor TR3.

The gate electrode of the output transistor TR3 is connected to the first scan line SL1. The source electrode of the output transistor TR3 is connected to the drain electrode of the amplification transistor TR2.

The drain electrode of the output transistor TR3 is connected to the fingerprint sensing line FL. The fingerprint sensing line FL may transmit a fingerprint detection signal FS.

Figure 4:
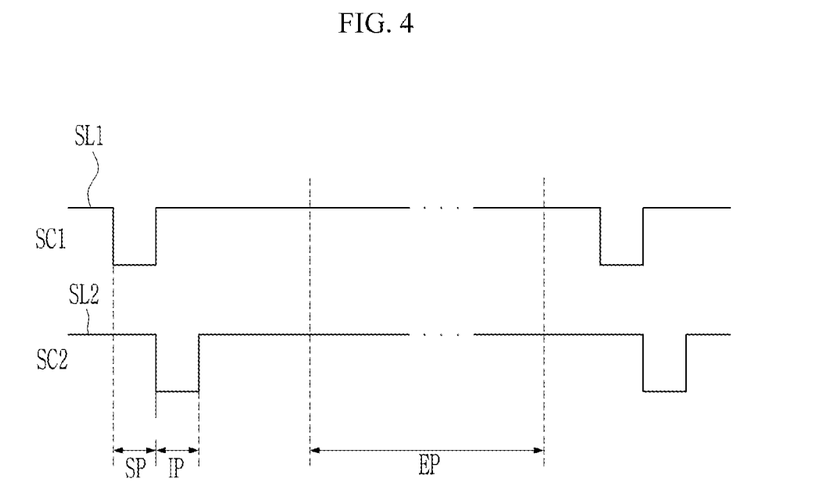
FIG. 4 is a timing diagram to exemplarily explain an operation of a photo sensing pixel shown in FIG. 3.

FIG. 4 is a timing diagram to explain an example of an operation of a photo sensing pixel shown in FIG. 3.

During a photo exposure period EP of the photo sensing pixel OS, the photo sensing element OSD is exposed to external light. The photo sensing element OSD charge can be used as a main charge carrier.

If there is a user input, the photo sensing element OSD generates the photo charges corresponding to the light reflected by the ridges of the fingerprints or the valleys between the ridges, and the generated photo charges may be accumulated in the charge storing node FN.

The amplification transistor TR2 may be a source follower amplifier that generates a source-drain current in proportion to the amount of the charge of the charge storing node FN input to the gate electrode.

During a sensing period SP, the first scan signal SC1 of a low level is supplied through the first scan line SL1. If the output transistor TR3 is turned on in response to the first scan signal SC1 of a low level, the fingerprint detection signal FS corresponding to the current flowing through the amplification transistor TR2 may be output to the fingerprint sensing line FL.

Next, if the second scan signal SC2 of a low level is supplied through the second scan line SL2 during an initialization period IP, the reset transistor TR1 is turned on. At this time, since the first scan signal SC1 of a high level is provided to the source electrode of the reset transistor TR1, the first scan signal SC1 of a high level is transmitted to the charge storing node FN, so that the charge storing node FN may be reset.

Next, during a photo exposure period EP, the photo sensing element OSD generates the photo charges corresponding to the received external light, and the generated photo charges may be accumulated in the charge storing node FN.

As described above, the transparent layer 230S is positioned overlapping the photo sensing pixel OS in a plan view. As the transparent layer 230S amplifies the light incident on the photo sensing pixel OS by a resonance, in order to maximize the sensing performance of the photo sensing pixel OS, it is important to form the transparent layer 230S with an appropriate thickness. The present embodiment is about a method for measuring the thickness of the transparent layer 230S of this photo sensing pixel.

Figure 5:
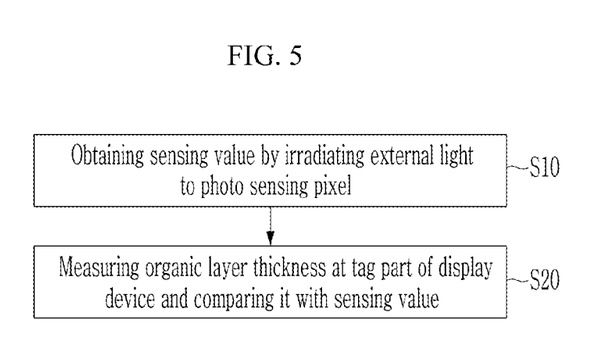
FIG. 5 is a view simply showing a method of measuring a thickness of a display device according to the present embodiment.

FIG. 5 is a view simply showing a method of measuring a thickness of a display device according to the present embodiment. Referring to FIG. 5, the method of measuring the thickness of the display device according to the present embodiment includes: obtaining a sensing value by irradiating external light to the photo sensing pixel (S10), and measuring an organic layer thickness of the tag part of the display device to compare with the sensing value (S20).

Figure 6:
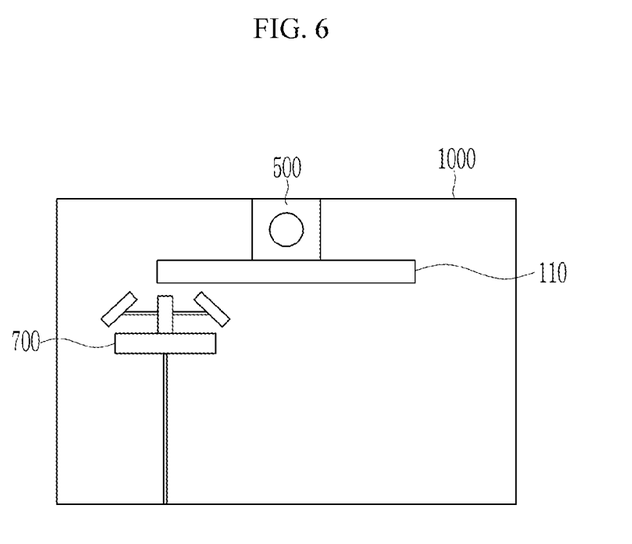
FIG. 6 is a view showing a method for measuring an organic layer thickness of a tag part of the display device by using an In Chamber Ellipsometer (ICE).

In general, the film thickness in the display device can be measured using an In Chamber Ellipsometer (ICE). This structure is shown in FIG. 6. Referring to FIG. 6, the substrate 110 is suspended through a fixing part 500 in a chamber 1000, and the film thickness at the edge tag part of the substrate 110 is measured through an ICE 700 from the bottom of the substrate 110.

This is to indirectly measure the deposition thickness at the center of the display device through directly measuring the thickness at the tag part positioned on the edge of the non-display unit because it is difficult to measure the specific deposition thickness at the center as one pixel positioned on the display unit of the display device is too small.

By using this ICE 700, the thickness of the deposition film, the resistance of the metal film, and the position difference between the organic layer and the tag part pattern may be measured.

In the case of the pixels positioned in the display device, the thickness information measured at the tag part and the deposition thickness information at the center of the pixel may be supplemented through a characteristic inspection (a color coordinate) in the ICP facility. This is a method that indirectly measures the thickness information, etc. through the color represented by each pixel.

That is, in a case of a normal light emission pixel PX, the thickness at the tag part is measured through an ICE, and the color coordinate value is measured at the pixel of the display device through the ICP, and then the deposition thickness at the pixel of the display device may be confirmed by comparing them with each other.

However, in the case of the photo sensing pixel, the color coordinate values cannot be measured through the ICP because it does not indicate a color. Therefore, it is not easy to measure the transparent layer 230S thickness of the photo sensing pixel.

However, in the display device according to the present embodiment, through scanning the external light to the photo sensing pixel OS to acquire the sensing value (S10) and measuring the thickness of the tag part of the display device to compare with the sensing value (S20), the transparent layer 230S thickness of the photo sensing pixel OS is measured.

First, acquiring (S10) the sensing value by scanning the external light to the photo sensing pixel OS is described.

As described above, the photo sensing pixel OS generates the photo charges when the external light is incident on it. By measuring the amount of the photo charges generated in this way, it is possible to determine the difference between the thickness of the transparent layer 230S and a standard value.

Figure 7:
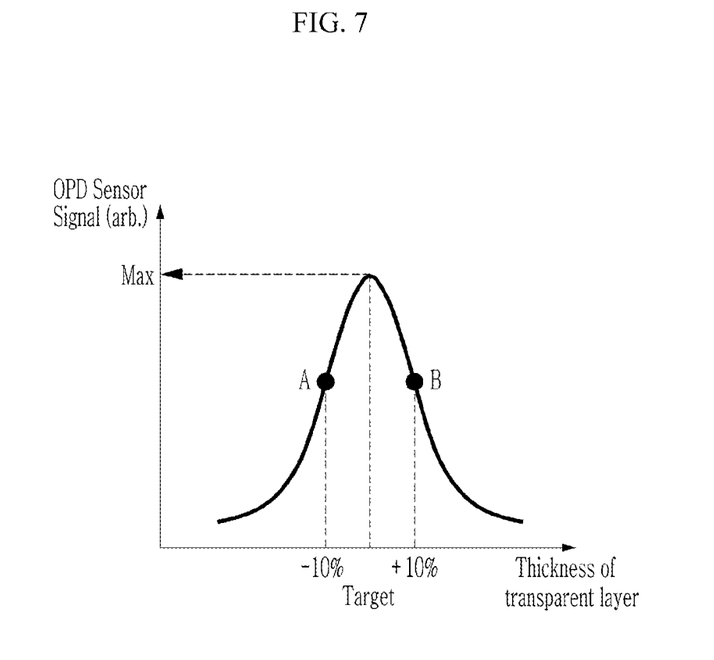
FIG. 7 is a graph showing a difference in a sensing value when a thickness of a transparent layer is differentiated.

FIG. 7 is a graph showing a difference in a sensing value when a thickness of a transparent layer 230S is differentiated from a target value. Referring to FIG. 7, the sensing value is highest when the thickness matches the target value, and the sensing value decreases as the thickness is farther from the target value. Therefore, the thickness may be determined by measuring the sensing value after the external light is incident on the photo sensing pixel OS. In this case, the incident external light may be light having a wavelength of 530 nanometers (nm). This is because the light with the wavelength of 530 nm may be the light actually used for the photo sensing of the photo sensing pixel OS. If the light used in the operation of the photo sensing pixel OS is different, the light used in this thickness measurement process may also be different. That is, the external light for the thickness measurement may have the same wavelength as the light used when the photo sensing pixel OS operates. In this embodiment, an organic photodiode ("OPD") sensor signal is used as the sensing value.

However, as shown in FIG. 7, when measuring the thickness through the sensing value, it is difficult to distinguish whether the thickness is lower than a standard value or thicker. In FIG. 7, the sensing value of A, where the thickness is thinner by 10% than the target value, and the sensing value of B, where the thickness is thicker by 10% than the target value, are the same. Therefore, if the thickness is inferred from the sensing value, it is not known which state of A and B is applicable.

Figure 8:
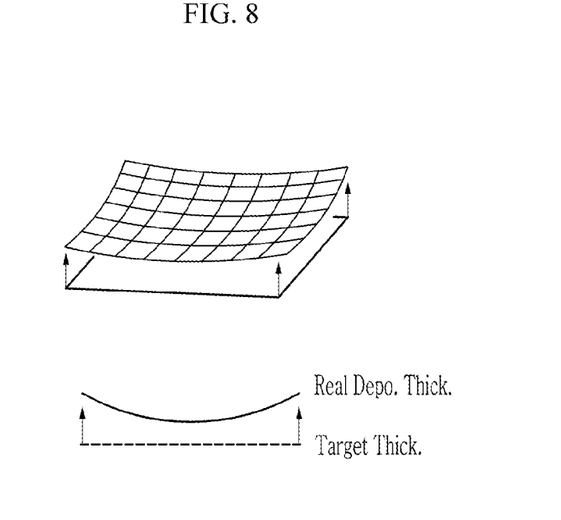
FIG. 8 is a view schematically showing a case where a deposition thickness of a transparent layer is thicker than a target value.
Figure 9:
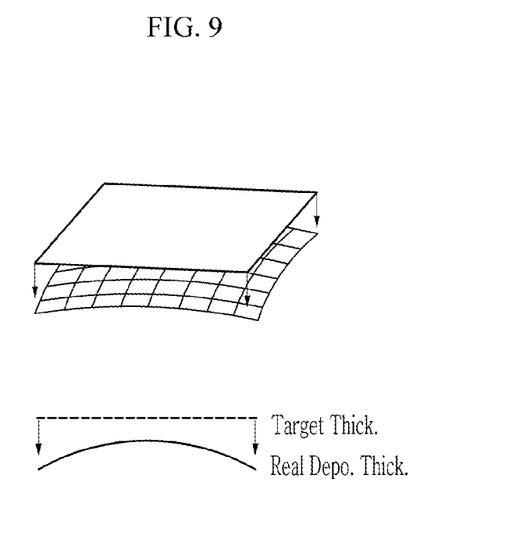
FIG. 9 is a view schematically showing a case where a deposition thickness of a transparent layer is thinner than a target value.

FIG. 8 is a view schematically showing a case where a deposition thickness of a transparent layer (Real Depo. Thick.) is thicker than a target value (hereinafter "case of thick thickness"). FIG. 9 is a view schematically showing a case where a deposition thickness of a transparent layer is thinner than a target value (hereinafter "case of thin thickness"). As used herein the "deposition thickness" of the transparent layer is a thickness of the transparent depending on a location as shown in FIGS. 8 and 9.

Figure 10:
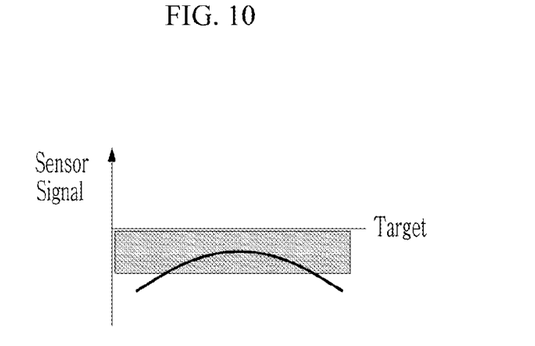
FIG. 10 is a view showing a sensing value of an embodiment of FIG. 8 and an embodiment of FIG. 9.

In cases of FIG. 8 and FIG. 9, the sensing value appears equally like FIG. 10. That is, both in the case of the thick thickness and the case of the thin thickness, since the sensing value appears like FIG. 10, it is not easy to distinguish whether the thickness of the currently deposited transparent layer corresponds to FIG. 8 or corresponds to FIG. 9.

Figure 11:
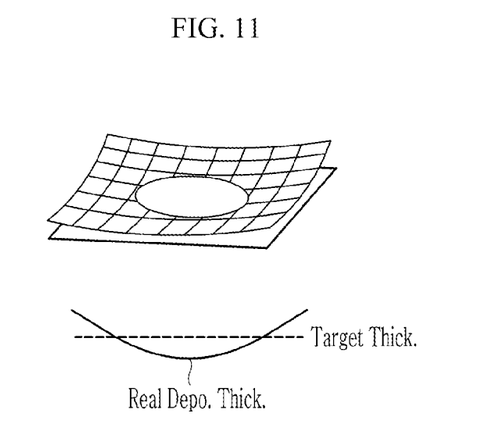
FIG. 11 and FIG. 12 are views showing a brief illustration of a case where a deposition thickness of each transparent layer is different from a target value.
Figure 12:
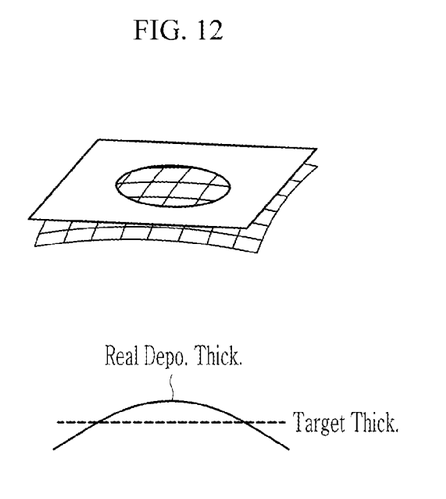

FIG. 11 and FIG. 12 are views showing a brief illustration of a case where a deposition thickness of each transparent layer is different from a target value depending on a location on the transparent layer. In the case of FIG. 11, the edge is thicker and the center is thinner than the target thickness (Target Thick.), and in the case of FIG. 12, the edge is thinner and the center is thicker than the target thickness. That is, the stacked forms of FIG. 11 and FIG. 12 are opposite to each other.

Figure 13:
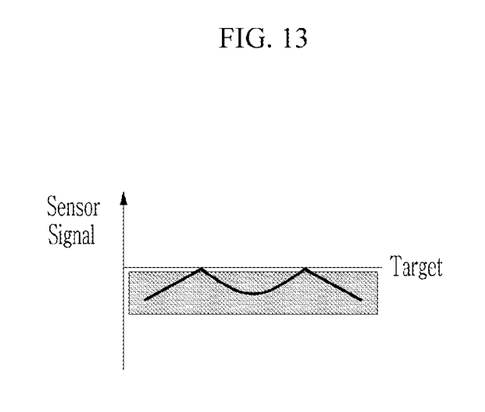
FIG. 13 is a view showing a sensing value of an embodiment of FIG. 11 and an embodiment of FIG. 12.

However, in the case of FIG. 11 and FIG. 12, the sensing value equally appears as shown in FIG. 13. This is because the sensing value only indicates the difference between the target thickness and the deposition thickness, and cannot distinguish whether the deposition thickness is thicker or thinner than the target thickness. Therefore, in acquiring the sensing value by scanning the external light to the photo sensing pixel (S10), when the sensing value appears as shown in FIG. 13, it may not distinguish whether the stacked form is the same as that of FIG. 11 or FIG. 12.

Accordingly, the method of measuring the thickness of the display device according to the present embodiment further includes measuring the thickness of the tag part of the display device to compare with the sensing value (S20).

As described above, in the case of the tag part positioned on the outer side of the display device, since the size of the tag part is larger than the pixel of the display device, the thickness of the tag part may be measured using equipment such as the ICE. These tag part may be positioned in the non-display area or the edge of the display device, and the stacking order and the thickness of the tag part may be the same as the pixel of the display device. Accordingly, at this stage, the thickness of the transparent layer 230S in the tag part is measured by using the ICE 700 as shown in FIG. 6. At this time, if the thickness of the transparent layer 230S of the tag part is thicker than the target value, it may be confirmed that the transparent layer 230S is also formed thicker in the photo sensing pixel OS of the display device.

That is, when the sensing value measured in acquiring the sensing value by scanning the external light to the photo sensing pixel (S10) appears as shown in FIG. 10, it is not easy to distinguish whether the thickness is formed to be thicker than the target thickness as shown in FIG. 8 or to be thinner than the target thickness as shown in FIG. 9. At this time, according to an embodiment, after the thickness of the transparent layer 230S on the tag part is determined through the measuring of the thickness of the tag part of the display device and comparing the measured thickness with the sensing value (20S), if the measured thickness of the tag part appears thicker than the target value, it may be inferred that the deposition is performed as shown in FIG. 8 in the display device. Conversely, when the measured thickness of the tag part is thinner than the target value, it may be inferred that the deposition form in the display device is the same as that in FIG. 9.

As such, the method of measuring the thickness of the display device according to the present embodiment is a method of comparing the sensing value of the photo sensing pixel with the measured thickness value at the tag part in the display device including the photo sensing pixel and is used to measure the thickness of the organic layer included in the photo sensing pixel.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A method of measuring a thickness of a display device, comprising:
    acquiring a sensing value by scanning external light to a photo sensing pixel of the display device; and
    measuring an organic layer thickness at a tag part of the display device and comparing the measured thickness with the sensing value, wherein the measuring of the organic layer thickness at the tag part of the display device is made using an In Chamber Ellipsometer (ICE),
    wherein the display device includes a light emission pixel and a photo sensing pixel,
    wherein the photo sensing pixel includes a photo sensing element and a transparent layer positioned on the photo sensing element,
    wherein the transparent layer amplifies light incident to the photo sensing pixel by resonance, and
    wherein the sensing value is highest when a deposition thickness of the transparent layer matches a target thickness, and the sensing value decreases as the deposition thickness of the transparent layer is farther from the target thickness.

2. The method of measuring the thickness of the display device of claim 1, wherein
    the external light is a light with a wavelength of 530 nanometers (nm).

3. The method of measuring the thickness of the display device of claim 1, wherein
    in the acquiring of the sensing value by scanning the external light to the photo sensing pixel,
    a difference between the target thickness and the deposition thickness of the transparent layer is derived through the comparison of the sensing value and the measured thickness.

4. The method of measuring the thickness of the display device of claim 3, wherein
    in the measuring of the organic layer thickness at the tag part of the display device and comparing the measured thickness with the sensing value,
    it is determined whether the deposition thickness is thicker or thinner than the target thickness.

5. The method of measuring the thickness of the display device of claim 1, wherein
    the light emission pixel includes a light-emitting element and a color filter positioned on the light-emitting element.

6. The method of measuring the thickness of the display device of claim 5, wherein the color filter and the transparent layer are positioned in a same layer.

7. The method of measuring the thickness of the display device of claim 5, wherein
the organic layer of the tag part of the display device and the transparent layer are formed by the same process and have a same thickness.

8. The method of measuring the thickness of the display device of claim 1, wherein
the photo sensing pixel detects the user's fingerprint.

9. The method of measuring the thickness of the display device of claim 1, wherein:
a wavelength of light used for photo sensing of the photo sensing pixel and a wavelength of the external light used in the acquiring of the sensing value by scanning external light to the photo sensing pixel are the same.

10. The method of measuring the thickness of the display device of claim 1, wherein
the tag part of the display device has a same stacked structure as the photo sensing pixel of the display device.

11. The method of measuring the thickness of the display device of claim 10, wherein
the tag part of the display device is positioned at an edge of the display device.

12. The method of measuring the thickness of the display device of claim 10, wherein
the tag part of the display device is positioned in a non-display area of the display device.

13. The method of measuring the thickness of the display device of claim 1, wherein
in the measuring of the organic layer thickness at the tag part of the display device and comparing the measured thickness with the sensing value,
measurement equipment is positioned under the display device during the measurement.

14. The method of measuring the thickness of the display device of claim 1, wherein
the light emission pixel includes a red pixel, a green pixel, and a blue pixel.

15. The method of measuring the thickness of the display device of claim 14, wherein
the green pixel is positioned above and below the photo sensing pixel in a second direction.

16. The method of measuring the thickness of the display device of claim 15, wherein
the red pixel and blue pixel are positioned to a left and a right of the photo sensing pixel in a first direction perpendicular to the second direction, respectively.

17. The method of measuring the thickness of the display device of claim 5, wherein the display device further includes:
a light blocking member positioned between the transparent layer and the color filter.

18. The method of measuring the thickness of the display device of claim 17, wherein
the light blocking member defines an opening therein overlapping the light emission pixel and the photo sensing pixel, and
a shape of the opening is quadrangular in a plan view.

* * * * *